US009660262B2

(12) United States Patent
Uebo et al.

(10) Patent No.: US 9,660,262 B2
(45) Date of Patent: May 23, 2017

(54) NONAQUEOUS ELECTROLYTE SECONDARY BATTERY

(71) Applicant: GS Yuasa International Ltd., Kyoto-shi, Kyoto (JP)

(72) Inventors: Yasushi Uebo, Kyoto (JP); Keisuke Anami, Kyoto (JP)

(73) Assignee: GS Yuasa International Ltd., Kyoto (JP)

(*) Notice: Subject to any disclaimer, the term of this patent is extended or adjusted under 35 U.S.C. 154(b) by 0 days.

(21) Appl. No.: 14/427,135

(22) PCT Filed: Sep. 9, 2013

(86) PCT No.: PCT/JP2013/005333
§ 371 (c)(1),
(2) Date: Mar. 10, 2015

(87) PCT Pub. No.: WO2014/041793
PCT Pub. Date: Mar. 20, 2014

(65) Prior Publication Data
US 2015/0221944 A1    Aug. 6, 2015

(30) Foreign Application Priority Data
Sep. 11, 2012  (JP) .................. 2012-199429

(51) Int. Cl.
*H01M 4/525*   (2010.01)
*H01M 4/505*   (2010.01)
(Continued)

(52) U.S. Cl.
CPC .......... *H01M 4/525* (2013.01); *H01M 4/131* (2013.01); *H01M 4/364* (2013.01); *H01M 4/485* (2013.01);
(Continued)

(58) Field of Classification Search
None
See application file for complete search history.

(56) References Cited

U.S. PATENT DOCUMENTS

| 6,746,800 B1 | 6/2004 | Sunagawa |
| 2002/0061443 A1 | 5/2002 | Nohma |

(Continued)

FOREIGN PATENT DOCUMENTS

| JP | 10059725 A2 | 3/1998 |
| JP | 2000082466 A2 | 3/2000 |

(Continued)

OTHER PUBLICATIONS

Machine Translation of JP 2006-278322 published Oct. 2006.*
(Continued)

*Primary Examiner* — Patrick Ryan
*Assistant Examiner* — Wyatt McConnell
(74) *Attorney, Agent, or Firm* — Rankin, Hill & Clark LLP

(57) ABSTRACT

A positive electrode for a nonaqueous electrolyte secondary battery according to the present invention includes particles A of a lamellar type lithium transition metal oxide and particles B of a spinel type lithium transition metal oxide, as a positive active material, at a ratio within the range of A:B=20:80 to 80:20 (weight ratio), in which a particle size distribution of the positive active material has a peak based on the particles A and a peak based on the particles B within the range of 1 to 50 μm. In the integrated distribution curve of the particle diameter, a particle diameter A(D50) at a degree of accumulation of the particles A of 50% and a particle diameter B(D50) at a degree of accumulation of the particles B of 50% satisfy the following expression (1), and a particle diameter A(D95) at a degree of accumulation of the particles A of 95% and a particle diameter B(D5) at a degree of accumulation of the particles B of 5% satisfy the following expression (2):

(Continued)

$B(D50) - A(D50) \geq 5$ μm  Expression (1)

$B(D5) > A(D95)$  Expression (2).

12 Claims, 1 Drawing Sheet

(51) Int. Cl.
  *H01M 4/131* (2010.01)
  *H01M 4/36* (2006.01)
  *H01M 10/052* (2010.01)
  *H01M 4/485* (2010.01)
  *H01M 10/0525* (2010.01)
  *H01M 4/02* (2006.01)

(52) U.S. Cl.
  CPC ......... *H01M 4/505* (2013.01); *H01M 10/052* (2013.01); *H01M 10/0525* (2013.01); *H01M 2004/021* (2013.01)

(56) References Cited

U.S. PATENT DOCUMENTS

| | | |
|---|---|---|
| 2002/0164528 A1 | 11/2002 | Sunagawa |
| 2006/0204845 A1 | 9/2006 | Lee |

FOREIGN PATENT DOCUMENTS

| | | |
|---|---|---|
| JP | 2000315503 A2 | 11/2000 |
| JP | 2002110253 A2 | 4/2002 |
| JP | 2002251996 A2 | 9/2002 |
| JP | 2005190786 A2 | 7/2005 |
| JP | 2005259639 A2 | 9/2005 |
| JP | 2006278322 A2 | 10/2006 |
| JP | 2007080583 A2 | 3/2007 |
| JP | 2008532221 12 | 8/2008 |
| JP | 2009004310 A2 | 1/2009 |
| JP | 2011054334 A2 | 3/2011 |
| JP | 4894969 | 3/2012 |

OTHER PUBLICATIONS

Machine Translation of JP H1059725 published Mar. 1998.*
Machine Translation of JP 2005-259639 published Sep. 2005.*
Machine Translation of JP 2005-190786 published Jul. 2005.*
International Search Report dated Nov. 5, 2013 filed in PCT/JP2013/005333.

* cited by examiner

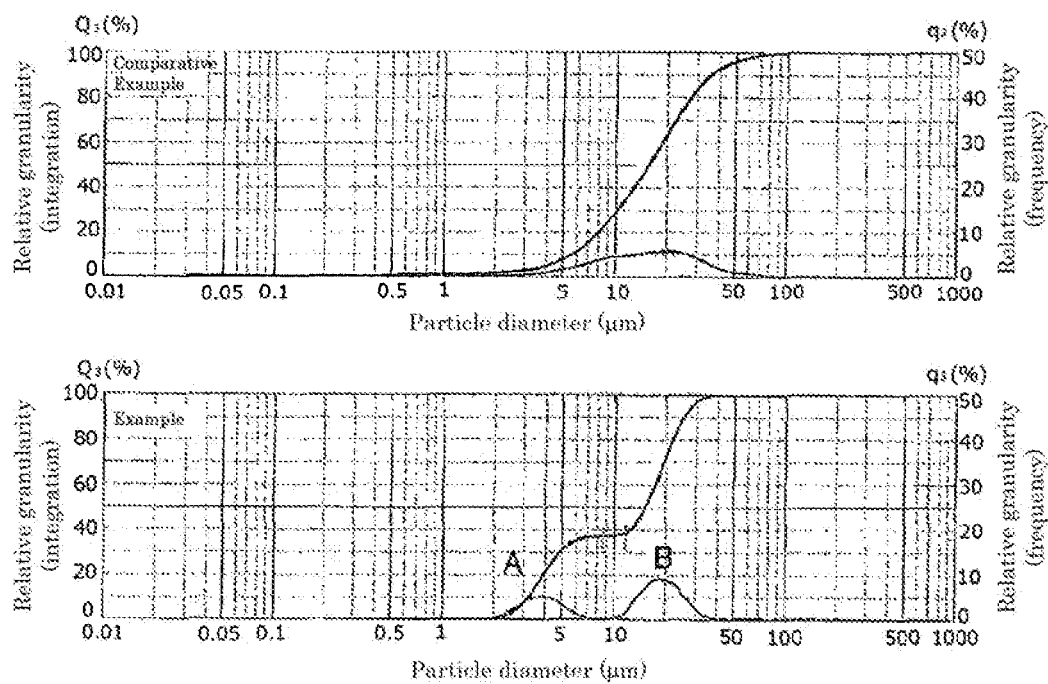

NONAQUEOUS ELECTROLYTE SECONDARY BATTERY

TECHNICAL FIELD

The present invention relates to a nonaqueous electrolyte secondary battery.

BACKGROUND ART

As a positive active material for a nonaqueous electrolyte secondary battery, a lithium transition metal composite oxide such as lithium cobalt oxide ($LiCoO_2$) or lithium nickel oxide ($LiNiO_2$) which has a lamellar rock salt type structure, or lithium manganese oxide ($LiMn_2O_4$) which has a spinel structure has been used. In particular, the lithium manganese oxide which has a spinel structure (hereinafter, referred to as a spinel type lithium manganese oxide) is high in thermal stability of a crystal structure, and a battery in which the lithium manganese oxide is used in a positive electrode has been widely employed because of exhibiting a high safety even at the time of being abnormally heated.

However, the theoretical capacity of the spinel type lithium manganese oxide is 148 mAh/g and is smaller than that of a lithium transition metal composite oxide which has a lamellar rock salt type structure (hereinafter, referred to as a lamellar type lithium transition metal oxide), and there is a problem that the energy density of a battery is decreased. Moreover, a problem that the power of a battery in which the spinel type lithium manganese oxide is used is lower than that of a battery in which the lamellar type lithium transition metal oxide is used has been caused.

In contrast, there has been proposed a method of mixing a lamellar type lithium transition metal oxide and a spinel type lithium transition metal oxide to be used for the positive active material. For example, in Patent Document 1, there has been proposed a lithium secondary battery in which an enhancement in energy density is achieved by mixing a lamellar type lithium transition metal oxide containing nickel, cobalt and manganese and a spinel type lithium manganese oxide to provide the positive active material. Moreover, in Patent Document 2, there has been proposed a lithium secondary battery in which highly enhanced output and prolonged life of the battery are achieved by allowing a lamellar type lithium transition metal composite oxide containing manganese and nickel and a spinel type lithium manganese oxide to be contained in the positive active material and allowing the composition ratio of nickel to the transition metal element other than lithium in the lamellar type lithium transition metal composite oxide to be 50% or more in terms of the molar ratio.

PRIOR ART DOCUMENTS

Patent Documents

Patent Document 1: JP-A-2008-532221
Patent Document 2: JP-A-2011-54334

SUMMARY OF THE INVENTION

Problems to be Solved by the Invention

However, the performance of the nonaqueous electrolyte secondary battery is still not sufficient, and there has been a demand for enhancing the life performance of the battery especially under a high temperature environment.

The present invention is aimed at providing a nonaqueous electrolyte secondary battery which has excellent life characteristics even under a high temperature environment.

Means for Solving the Problems

In order to solve the above-mentioned problems, the nonaqueous electrolyte secondary battery according to the present invention has the following features. The nonaqueous electrolyte secondary battery includes particles A of a lamellar type lithium transition metal oxide and particles B of a spinel type lithium transition metal oxide, as a positive active material, at a ratio within the range of A:B=20:80 to 80:20 (weight ratio), in which a particle size distribution of the positive active material has a peak based on the particles A and a peak based on the particles B within the range of 1 to 50 μm, and in a particle size distribution in terms of volume, a particle diameter A(D50) at a degree of accumulation of the particles A of 50% and a particle diameter B(D50) at a degree of accumulation of the particles B of 50% satisfy the following expression (1), and a particle diameter A(D95) at a degree of accumulation of the particles A of 95% and a particle diameter B(D5) at a degree of accumulation of the particles B of 5% satisfy the following expression (2):

$$B(D50)-A(D50) \geq 5 \text{ μm} \qquad \text{Expression (1)}$$

$$B(D5) > A(D95) \qquad \text{Expression (2).}$$

Moreover, in order to solve the above-mentioned problems, the nonaqueous electrolyte secondary battery according to the present invention has the following features. The nonaqueous electrolyte secondary battery includes particles A of a lamellar type lithium transition metal oxide and particles B of a spinel type lithium transition metal oxide, as a positive active material, at a ratio within the range of A:B=20:80 to 80:20 (weight ratio), in which a particle size distribution of the positive active material has a peak based on the particles A and a peak based on the particles B within the range of 1 to 50 μm, and in a particle size distribution in terms of volume, a particle diameter A(D50) at a degree of accumulation of the particles A of 50% and a particle diameter B(D50) at a degree of accumulation of the particles B of 50% satisfy the following expression (3):

$$B(D50)/A(D50) > 4 \qquad \text{Expression (3).}$$

Furthermore, it is preferred that each of a half-value width of the peak based on the particles A and a half-value width of the peak based on the particles B be 20 μm or less. According to this constitution, it is possible to attain more excellent life characteristics under a high temperature environment.

Moreover, it is preferred that a minimum particle diameter of the particles B be larger than a maximum particle diameter of the particles A. According to this constitution, it is possible to attain more excellent life characteristics under a high temperature environment.

Furthermore, it is preferred that the particle diameter A(D50) at a degree of accumulation of the particles A of 50% be less than 5 μm. According to this constitution, since each of the particles A can easily enter a space formed between each of the particles B and each of the particles B, it is possible to attain more excellent life characteristics under a high temperature environment.

It is preferred that the particles A of a lamellar type lithium transition metal oxide be made of a lithium transition metal oxide represented by a general formula $LiNi_xMn_yCo_{x-}$ $Q_aO_2$ (Q denotes at least one element selected from the group consisting of group 2 to group 15 elements in the Periodic Table of the Elements, preferably denotes at least one element selected from the group consisting of Li, Ti, V, Cr, Fe, Cu, Zn, B, P, Mg, Al, Ca, Zr, Mo and W, and x+y+z+a=1, x>0, y>0, z>0 and 0.1≥a>0). According to the constitution, it is possible to attain a high level of safety as well as to attain excellent life characteristics under a high temperature environment.

Advantages of the Invention

According to the present invention, it is possible to provide a nonaqueous electrolyte secondary battery which has excellent life characteristics even under a high temperature environment.

BRIEF DESCRIPTION OF THE DRAWING

FIG. 1 is a diagram showing particle diameter distributions of active materials of Example 1 and Comparative Example 1.

MODE FOR CARRYING OUT THE INVENTION

Hereinafter, an embodiment according to the present invention will be described, but the present invention should not be limited to the following description.
(Positive Electrode)

A positive active material used in the present invention contains particles A of a lamellar type lithium transition metal oxide and particles B of a spinel type lithium transition metal oxide. The lamellar type lithium transition metal oxide is capable of insertion and desorption of lithium ions, and a lithium transition metal oxide represented by a general formula $LiNi_xMn_yCo_zQ_aO_2$ (Q denotes at least one element selected from the group consisting of group 2 to group 15 elements in the Periodic Table of the Elements, preferably denotes at least one element selected from the group consisting of Li, Ti, V, Cr, Fe, Cu, Zn, B, P. Mg, Al, Ca, Zr, Mo and W, and x+y+z+a=1, x>0, y>0, z>0 and 0.1≥a>0) can be preferably used. In the general formula, when the proportion of nickel exceeds 0.5, the degree of expansion or contraction of the particles A associated with charge-discharge is larger, the thermal decomposition temperature is lowered, the thermal stability is decreased, and therefore it is preferred that x satisfy the expression of 0<x≤0.5. Moreover, the spinel type lithium transition metal oxide is not particularly limited as long as it is a lithium transition metal oxide which is capable of insertion and desorption of lithium ions and has a spinel crystal structure containing manganese. A lithium transition metal oxide represented by a general formula $Li_aMn_{2\beta}R_\beta O_4$ (R denotes at least one element selected from the group consisting of Ti, V, Cr, Fe, Cu, Zn, B, P, Mg, Al, Ca, Zr, Mo and W, and 0≤α≤1.15 and 0≤β≤0.2) can be preferably used. Preferred specific examples thereof include $Li_{1.1}Mn_{1.8}Al_{0.1}O_4$.

The mixing ratio of the particles A of a lamellar type lithium transition metal oxide and the particles B of a spinel type lithium transition metal oxide is within the range of A:B=20:80 to 80:20 (weight ratio), preferably 20:80 to 50:50. When the proportion of the particles A is less than 20, the proportion is not preferred because the energy density of a battery is decreased, and when the proportion of the particles A is more than 80, the proportion is not preferred because life characteristics are easily deteriorated.

Moreover, the positive active material used in the present invention has a peak based on the particles A and a peak based on the particles B within the range of 1 to 50 μm, preferably within the range of 30 μm or less, in the particle size distribution thereof. In this context, having a peak based on the particles A and a peak based on the particles B means that two well-defined peaks corresponding to two kinds of the particles exist, and two particle diameter distributions of two kinds of the particles slightly overlap (this will be described later), preferably do not overlap. In the present invention, a value measured using a laser diffraction scattering type particle size distribution measuring apparatus is used for the particle diameter, and the particle diameter is a particle diameter on the basis of volume. Moreover, the particles A and the particles B may be formed of a single polycrystalline body (formed only of primary particles), or may form secondary particles by aggregation of a plurality of polycrystalline bodies.

Moreover, in the present invention, in the integrated distribution of the particle diameter, a particle diameter A(D50) at a degree of accumulation of the particles A of 50% and a particle diameter B(D50) at a degree of accumulation of the particles B of 50% satisfy the following expression (1), and a particle diameter A(D95) at a degree of accumulation of the particles A of 95% and a particle diameter B(D5) at a degree of accumulation of the particles B of 5% satisfy the following expression (2).

$$B(D50)-A(D50) \geq 5 \text{ μm} \qquad \text{Expression (1)}$$

$$B(D5)>A(D95) \qquad \text{Expression (2)}$$

The two expressions indicate that the overlap between the two particle diameter distributions of two kinds of the particles A and B is slight and the difference between B(D50) and A(D50) is 5 μm or more, preferably 10 μm or more. It is also indicated that B(D5) is larger than A(D95), preferably B(D5) is larger than A(D95) by 1 μm or more. In the present invention, the particle diameter at a degree of accumulation of 50% is also referred to as an average particle diameter.

Moreover, in the present invention, each of the half-value width of the peak based on the particles A and the half-value width of the peak based on the particles B is preferably 20 μm or less, further preferably 15 μm or less. The half-value width is a value defined as a width at 50% of the peak height in the particle diameter distribution. In this case, since it is possible to suppress decomposition of an electrolyte solution on the active material surface as well as to reduce the amounts of fine powder and coarse powder in the particles to further homogenize the distribution of active materials, life characteristics at high temperatures can be more enhanced.

Furthermore, in the present invention, it is preferred that the two particle diameter distributions of two kinds of the particles A and B do not overlap, namely, the minimum particle diameter of the particles B be larger than the maximum particle diameter of the particles A. In this case, since it is possible to further homogenize the distribution of active materials in the positive electrode, homogenization of current distribution and an enhancement in current collection property can be more preferably attained.

The synthetic method of the lamellar type lithium transition metal oxide is not particularly limited, and examples thereof include a solid phase method, a liquid phase method, a sol-gel method, and a hydrothermal method. For example, in the case of the three-component system of Ni—Co—Mn, manganese sulfate hydrate, nickel sulfate hydrate and cobalt sulfate hydrate are mixed at a prescribed molar ratio and dissolved in an aqueous solution, after which a precursor of Ni—Co—Mn is obtained by a co-precipitation method. By mixing this precursor with a prescribed amount of lithium hydroxide and firing the mixture, a lamellar type lithium transition metal oxide containing Ni, Co and Mn can be obtained. By subjecting this lamellar type lithium transition metal oxide to crushing and classification to exclude the fine powder and the coarse powder, the lamellar type lithium transition metal oxide can be adjusted so as to have a prescribed particle diameter distribution. In this connection, also by adjusting the firing temperature and the firing time at the time of firing, it is possible to obtain a lamellar type lithium transition metal oxide which has a desired average particle diameter and a desired particle diameter distribution. For example, by increasing the firing temperature and prolonging the firing time, a lamellar type lithium transition metal oxide which has a large average particle diameter and a narrow particle diameter distribution can be obtained. Moreover, by decreasing the firing temperature and shortening the firing time, a lamellar type lithium transition metal oxide which has a small average particle diameter and a wide particle diameter distribution can be obtained.

The synthetic method of the spinel type lithium transition metal oxide is not particularly limited, and examples thereof include a solid phase method, a liquid phase method, a sol-gel method, and a hydrothermal method. For example, in the case of the manganese system, a solution prepared by mixing lithium hydroxide and MnO2 at a prescribed molar ratio is dried by a spray-dry method to obtain a precursor containing Li and Mn, and then, the precursor is calcined and fired to obtain a spinel type lithium transition metal oxide. By subjecting this spinel type lithium transition metal oxide to crushing and classification to exclude the fine powder and the coarse powder, the lamellar type lithium transition metal oxide can be adjusted so as to have a prescribed particle diameter distribution. In this connection, also by adjusting the firing temperature and the firing time at the time of firing, it is possible to obtain a spinel type lithium transition metal oxide which has a desired average particle diameter and a desired particle diameter distribution. For example, by increasing the firing temperature and prolonging the firing time, a spinel type lithium transition metal oxide which has a large average particle diameter and a narrow particle diameter distribution can be obtained. Moreover, by decreasing the firing temperature and shortening the firing time, a spinel type lithium transition metal oxide which has a small average particle diameter and a wide particle diameter distribution can be obtained.

The positive electrode is prepared by applying a positive composite layer containing the positive active material to the surface of a positive current collector made of aluminum foil or aluminum alloy foil, and drying the resultant.

The positive composite layer can contain, in addition to the positive active material, a conductive agent, a binding agent, and the like. As the conductive agent, acetylene black, carbon black, graphite, and the like can be used. As the binding agent, polyvinylidene fluoride, a vinylidene fluoride-hexafluoropropylene copolymer, a styrene-butadiene rubber, polyacrylonitrile, and the like can be used singly or as a mixture.

(Negative Electrode)

A negative electrode is prepared by applying a negative composite layer containing a negative active material to the surface of a negative current collector made of copper foil or copper alloy foil, and drying the resultant.

As the negative active material, a carbon material, an alloy-based compound of Al, Si, Pb, Sn, Zn, Cd or the like with lithium, metallic lithium, a metal oxide represented by a general formula M4Oz (provided that M4 denotes at least one element selected from W, Mo, Si, Cu and Sn, and $0 \leq z \leq 2$), and the like can be used. Of these, a carbon material is preferred, and as the carbon material, black lead, hard carbon, graphitizable carbon, and a mixture thereof can be used. In a negative electrode plate, as in the case of a positive electrode plate, a binding agent such as polyvinylidene fluoride and a styrene-butadiene rubber can be added. It is preferred that the negative electrode plate contain carboxymethyl cellulose (CMC). Thus, it is considered that degradation of the negative electrode can be suppressed and life characteristics of a battery can be more enhanced.

(Nonaqueous Electrolyte)

An organic solvent constituting a nonaqueous electrolyte is not particularly limited as long as the organic solvent is used for a nonaqueous electrolyte secondary battery. Specific examples thereof include cyclic carboxylic acid esters such as propylene carbonate, ethylene carbonate and chloroethylene carbonate, chain carbonates such as dimethyl carbonate, diethyl carbonate and ethyl methyl carbonate, chain carboxylic acid esters such as methyl acetate and methyl butyrate, tetrahydrofuran or derivatives thereof, ethers such as 1,3-dioxane, dimethoxyethane, diethoxyethane, methoxyethoxyethane and methylglyme, nitriles such as acetonitrile and benzonitrile, and dioxolane or derivatives thereof, which are used singly or as a mixture of two or more thereof.

An electrolyte salt constituting the nonaqueous electrolyte is not particularly limited as long as the electrolyte salt is used for a nonaqueous electrolyte secondary battery. Specific examples include $LiBF_4$, $LiPF_6$, $LiClO_4$, $LiCF_3SO_3$, $LiN(CF_3SO_2)_2$, $LiN(C_2FaSO_2)_2$, $LiN(CF_aSO_2)$, $(C_4F_9SO_2)$, $LiC(CF_3SO_2)_4$ and $LiC(C_2F_5SO_2)_3$, which may be used singly or as a mixture of two or more thereof.

(Separator)

As a separator, a microporous membrane, nonwoven fabric, and the like can be used singly or in combination. Of these, from the viewpoints of processability and durability, an olefin-based resin such as polyethylene and polypropylene is preferred. Moreover, a heat-resistant resin prepared by providing an aramid layer or an inorganic compound on the surface of a polyolefin-based microporous membrane can also be used. An inorganic compound is preferably provided on the positive electrode side surface of the separator because life performance of a battery can be more enhanced. It is considered that the inorganic compound suppresses oxidative decomposition of the separator resin portion and thus a side reaction on the positive electrode is suppressed, to enable to reduce the possibility that the current distribution in the positive electrode is uneven.

(Preparation of Battery)

The positive electrode and the negative electrode obtained in this way are stacked and spirally wound with the separator interposed therebetween to prepare an electrode assembly. This electrode assembly is housed in a battery case, for example, an aluminum prismatic battery container can. A battery lid provided with a safety valve is attached to the battery case by laser beam welding, a negative electrode terminal is connected to the negative electrode through a negative electrode lead, and the positive electrode is connected to the battery lid through a positive electrode lead. Then, a nonaqueous electrolyte solution is injected under reduced pressure, after which an electrolyte solution filling port is sealed by laser beam welding to prepare a nonaqueous electrolyte secondary battery.

EXAMPLES

Hereinafter, the present invention will be described in more detail with reference to examples, but the present invention should not be limited to the following examples.

Example 1

(Synthesis of Positive Active Material)
(1) Synthesis of Lamellar Type Lithium Transition Metal Oxide Manganese sulfate hydrate, nickel sulfate hydrate and cobalt sulfate hydrate were mixed at a prescribed molar ratio and dissolved in an aqueous solution, after which a precursor of Ni—Co—Mn was obtained by a co-precipitation method. This precursor was mixed with a prescribed amount of lithium hydroxide and the mixture was fired in the air at 900° C. for 10 hours, to thereby obtain $LiNi_{0.33}Co_{0.33}Mn_{0.33}O_2$. Then, this lamellar type lithium transition metal oxide was subjected to crushing and classification to obtain particles A. In the present specification, unless otherwise specified, the value calculated from the molar ratio of the raw materials charged is used for the composition of the lithium transition metal oxide.

(2) Synthesis of Spinel Type Lithium Transition Metal Oxide

A solution prepared by mixing lithium hydroxide, aluminum hydroxide and MnO2 at a prescribed molar ratio was dried by a spray-dry method to obtain a precursor containing Li and Mn. The precursor was calcined in the air at 500° C. for 12 hours, and then fired at 750° C. for 12 hours to obtain $Li_{1.1}Mn_{1.8}Al_{0.1}O_4$. Then, this spinel type lithium transition metal oxide was subjected to crushing and classification to obtain particles B.

The particles A and the particles B were mixed in a proportion of 30:70 in terms of weight ratio to obtain a positive active material.

(Preparation of Positive Electrode)

A solution containing 5 parts by weight of polyvinylidene fluoride in N-methyl-2-pyrrolidone was mixed with 90 parts by weight of a positive active material and 5 parts by weight of acetylene black to obtain a paste. This paste was applied on both faces of aluminum foil (20 μm in thickness) by a doctor blade method to form a positive active material layer. Then, this positive active material layer was dried in vacuum at 150° C. for 14 hours to obtain a positive electrode. The thickness of the positive electrode was 185 μm.

(Preparation of Negative Electrode)

A solution containing 5 parts by weight of polyvinylidene fluoride in N-methyl-2-pyrrolidone was mixed with 95 parts by weight of natural graphite to obtain a paste. This paste was applied on both faces of copper foil (10 μm in thickness) by a doctor blade method to form a negative active material layer. Then, this negative active material layer was dried in vacuum at 150° C. for 14 hours to obtain a negative electrode. The thickness of the negative electrode was 105 μm.

(Electrolyte Solution)

A mixed solvent of ethylene carbonate and diethyl carbonate at a volume ratio of 30:70 was used in an electrolyte solution. As an electrolyte, 1 mol/l $LiPF_6$ was used.

(Preparation of Battery)

The positive electrode and the negative electrode were stacked and spirally wound with a polyethylene-based porous separator interposed therebetween to prepare a spirally wound element. The spirally wound element was housed in an aluminum prismatic battery case. A battery lid provided with a safety valve was attached to the battery case by laser beam welding, a negative electrode terminal was connected to the negative electrode through a negative electrode lead, and the positive electrode was connected to the battery lid through a positive electrode lead. Afterward, the electrolyte solution was injected under reduced pressure, after which the electrolyte solution filling port was sealed by laser beam welding. In this way, a prismatic nonaqueous electrolyte secondary battery with a design capacity of (550) mAh was prepared.

(Particle Diameter Measurement)

The particle diameters of the particles A and the particles B were measured by the following procedure using a laser diffraction scattering type particle size distribution measuring apparatus (manufactured by Shimadzu Corporation, SALD-2000J). First, the prepared particles A or particles B and an anionic surfactant were thoroughly kneaded, and then ion-exchanged water (water prepared by removing ions in water with an ion exchange resin) was added thereto. Then, the resultant was irradiated with ultrasonic waves for 20 minutes, and the particles A or the particles B were dispersed in the ion-exchanged water, after which the particles were subjected to measurement of the particle diameter using the laser diffraction scattering type particle size distribution measuring apparatus. The measurement results were obtained as a particle size distribution histogram and respective values of D5, D50 and D95 (D5, D50 and D95 were particle sizes where the cumulative volumes of the secondary particles in the particle size distribution were 5%, 50% and 95%, respectively). With regard to the mixture of the particles A and the particles B, the particle size distribution could be measured by the same procedure. In the case where a peak based on the particles A and a peak based on the particles B overlapped and the values of D5 and D95 of each of the particles A and the particles B could not be individually obtained, the particle size distribution curves of the two kinds of the particles were approximated as proper fitting curves to determine the respective values of D5, D50 and D95 of the two kinds of the particles. The obtained results are shown in Table 1. The D50 (average particle diameter) of the particles A and the D50 (average particle diameter) of the particles B were 4 μm and 18 μm, respectively. The maximum particle diameter and the minimum particle diameter were values as particle diameters read at the maximum and minimum where particles existed in the particle size distribution histogram.

(Nail Penetration Test)

According to a method described in "Guidelines for safety evaluation technologies for lithium secondary battery (SBA G101)" published by Japan Storage Battery Industries Association, the above-mentioned prismatic battery was subjected to a nail penetration test. In this method, a nail with a thickness of 2.5 mm to 6 mm in diameter was allowed to penetrate through a substantially center part of a battery in a fully charged state in the direction perpendicular to the electrode face at room temperature, and left to stand for 6 hours or more. While this test method is intended for abuse such that a nail or the like is inserted by mistake at the time of packing a battery (packing a battery into a wooden box), a nail is allowed to penetrate through to thereby cause an internal short-circuiting state where the positive electrode and the negative electrode are brought into direct contact with each other in the inside of the battery, and therefore the test method is also utilized as a method for evaluating the possibility of fire or rupture due to heat generation by a sudden reaction in the inside of the battery.

The nail penetration test was evaluated according to the following criteria.

No abnormality: No operation of the safety valve, and neither smoke nor fire.

Abnormality: Smoke or fire.

Liquid leakage: 10% or more relative to the whole amount of the electrolyte solution (Charge-Discharge Test)

The charge-discharge test was performed at 45° C. using the above-mentioned battery. The battery was charged to 4.1 V at a current of 1.0 mA/cm$^2$, after which the discharge capacity was measured at the time when the battery was discharged to 2.5 V at a current of 1.0 mA/cm$^2$, to calculate a capacity (referred to as an initial capacity) per 1 g of the positive active material. Under the same conditions, the charge-discharge cycle was repeated 1000 times to calculate a percentage of the capacity after 1000 cycles relative to the initial capacity as the capacity retention ratio. The results are shown in Table 1. In the present Example 1, a capacity retention ratio of 82% was attained.

Example 2

A positive electrode was prepared in the same manner as in Example 1 except that the crushing condition and the classification condition were changed while the lamellar type lithium transition metal oxide and the spinel type lithium transition metal oxide synthesized in Example 1 were used, and a battery was assembled and evaluated. The results are shown in Table 1.

Examples 3 to 6

A positive electrode was prepared in the same manner as in Example 1 except that the mixing ratio of the particles A and the particles B used in Example 1 was changed, and a battery was assembled and evaluated. The results are shown in Table 1.

Examples 7, 9 and 10

A positive electrode was prepared in the same manner as in Example 1 except that the molar ratio of manganese sulfate hydrate, nickel sulfate hydrate and cobalt sulfate hydrate charged was changed in Example 1 to synthesize a lamellar type lithium transition metal oxide, and a battery was assembled and evaluated. The results are shown in Table 1.

Example 8

A positive electrode was prepared in the same manner as in Example 1 except that, as the lamellar type lithium transition metal oxide, $LiNi_{0.33}Co_{0.33}Mn_{0.33}Zr_{0.01}O_2$ synthesized by using zirconium sulfate hydrate in addition to manganese sulfate hydrate, nickel sulfate hydrate and cobalt sulfate hydrate was used in Example 1, and a battery was assembled and evaluated. The results are shown in Table 1.

Comparative Examples 1 to 6 and 9

A positive electrode was prepared in the same manner as in Example 1 except that the crushing condition and the classification condition were changed while the lamellar type lithium transition metal oxide and the spinel type lithium transition metal oxide synthesized in Example 1 were used, and a battery was assembled and evaluated. The results are shown in Table 1.

Comparative Examples 7 and 8

A positive electrode was prepared in the same manner as in Example 1 except that the mixing ratio of the particles A and the particles B used in Example 1 was changed, and a battery was assembled and evaluated. The results are shown in Table 1.

TABLE 1

| | | Positive active material | | | | | |
|---|---|---|---|---|---|---|---|
| | | Particles A | | | | | |
| | | Composition | D50 (μm) | D95 (μm) | Maximum particle diameter (μm) | Half-value width (μm) | Particles B Composition |
| Example | 1 | $LiNi_{0.33}Co_{0.33}Mn_{0.33}O_2$ | 4 | 6 | 7.5 | 2.7 | $Li_{1.1}Mn_{1.8}Al_{0.1}O_4$ |
| | 2 | $LiNi_{0.33}Co_{0.33}Mn_{0.33}O_2$ | 7 | 9 | 11 | 3.5 | $Li_{1.1}Mn_{1.8}Al_{0.1}O_4$ |
| | 3 | $LiNi_{0.33}Co_{0.33}Mn_{0.33}O_2$ | 4 | 6 | 7.5 | 2.7 | $Li_{1.1}Mn_{1.8}Al_{0.1}O_4$ |
| | 4 | $LiNi_{0.33}Co_{0.33}Mn_{0.33}O_2$ | 4 | 6 | 7.5 | 2.7 | $Li_{1.1}Mn_{1.8}Al_{0.1}O_4$ |
| | 5 | $LiNi_{0.33}Co_{0.33}Mn_{0.33}O_2$ | 4 | 6 | 7.5 | 2.7 | $Li_{1.1}Mn_{1.8}Al_{0.1}O_4$ |
| | 6 | $LiNi_{0.33}Co_{0.33}Mn_{0.33}O_2$ | 4 | 6 | 7.5 | 2.7 | $Li_{1.1}Mn_{1.8}Al_{0.1}O_4$ |
| | 7 | $LiNi_{0.165}Co_{0.67}Mn_{0.165}O_2$ | 3.9 | 6 | 8 | 3.1 | $Li_{1.1}Mn_{1.8}Al_{0.1}O_4$ |
| | 8 | $LiNi_{0.33}Co_{0.33}Mn_{0.33}Zr_{0.01}O_2$ | 4.1 | 5.9 | 7.5 | 2.7 | $Li_{1.1}Mn_{1.8}Al_{0.1}O_4$ |
| | 9 | $LiNi_{0.5}Co_{0.2}Mn_{0.3}O_2$ | 5.1 | 6.8 | 8 | 3 | $Li_{1.1}Mn_{1.8}Al_{0.1}O_4$ |
| | 10 | $LiNi_{0.8}Co_{0.15}Al_{0.05}O_2$ | 6.5 | 8 | 9 | 3.9 | $Li_{1.1}Mn_{1.8}Al_{0.1}O_4$ |
| Comparative Example | 1 | $LiNi_{0.33}Co_{0.33}Mn_{0.33}O_2$ | 4 | 6 | 7.7 | 2 | $Li_{1.1}Mn_{1.8}Al_{0.1}O_4$ |
| | 2 | $LiNi_{0.33}Co_{0.33}Mn_{0.33}O_2$ | 12 | 19 | 22 | 7 | $Li_{1.1}Mn_{1.8}Al_{0.1}O_4$ |
| | 3 | $LiNi_{0.33}Co_{0.33}Mn_{0.33}O_2$ | 12 | 19 | 22 | 7 | $Li_{1.1}Mn_{1.8}Al_{0.1}O_4$ |
| | 4 | $LiNi_{0.33}Co_{0.33}Mn_{0.33}O_2$ | 14 | 21 | 24 | 24 | $Li_{1.1}Mn_{1.8}Al_{0.1}O_4$ |
| | 5 | $LiNi_{0.33}Co_{0.33}Mn_{0.33}O_2$ | 12 | 16 | 17 | 5 | $Li_{1.1}Mn_{1.8}Al_{0.1}O_4$ |
| | 6 | $LiNi_{0.33}Co_{0.33}Mn_{0.33}O_2$ | 0.8 | 3 | 4.2 | 3 | $Li_{1.1}Mn_{1.8}Al_{0.1}O_4$ |
| | 7 | $LiNi_{0.33}Co_{0.33}Mn_{0.33}O_2$ | 4 | 6 | 7.5 | 2.7 | $Li_{1.1}Mn_{1.8}Al_{0.1}O_4$ |
| | 8 | $LiNi_{0.33}Co_{0.33}Mn_{0.33}O_2$ | 4 | 6 | 7.5 | 2.7 | $Li_{1.1}Mn_{1.8}Al_{0.1}O_4$ |
| | 9 | $LiNi_{0.33}Co_{0.33}Mn_{0.33}O_2$ | 0.8 | 3 | 4.2 | 3 | $Li_{1.1}Mn_{1.8}Al_{0.1}O_4$ |

TABLE 1-continued

|  |  | Positive active material | | | | Characteristics | |
|---|---|---|---|---|---|---|---|
|  |  | Particles B | | | | | |
|  |  | D50 (μm) | D5 (μm) | Maximum particle diameter (μm) | Half-value width (μm) | Mixing ratio A-B | Result of nail penetration test | Capacity retention ratio (%) |
| Example | 1 | 18 | 11 | 9.5 | 14 | 30:70 | No abnormality | 82 |
|  | 2 | 20 | 10 | 9.5 | 14.3 | 30:70 | No abnormality | 72 |
|  | 3 | 18 | 11 | 9.5 | 14 | 20:80 | No abnormality | 82 |
|  | 4 | 18 | 11 | 9.5 | 14 | 50:50 | No abnormality | 80 |
|  | 5 | 18 | 11 | 9.5 | 14 | 70:30 | No abnormality | 76 |
|  | 6 | 18 | 11 | 9.5 | 14 | 80:20 | No abnormality | 73 |
|  | 7 | 18 | 11 | 9.5 | 14 | 30:70 | No abnormality | 83 |
|  | 8 | 18 | 11 | 9.5 | 14 | 30:70 | No abnormality | 84 |
|  | 9 | 18 | 11 | 9.5 | 14 | 30:70 | No abnormality | 76 |
|  | 10 | 18 | 11 | 9.5 | 14 | 30:70 | Liquid leakage | 72 |
| Comparative Example | 1 | 4.5 | 4 | 3.5 | 3 | 30:70 | No abnormality | 59 |
|  | 2 | 4 | 3 | 2.8 | 3 | 30:70 | No abnormality | 52 |
|  | 3 | 16 | 6 | 3 | 30 | 30:70 | No abnormality | 60 |
|  | 4 | 18 | 11 | 9 | 15 | 30:70 | Liquid leakage | 57 |
|  | 5 | 16 | 6 | 4.1 | 30 | 30:70 | No abnormality | 58 |
|  | 6 | 58 | 30 | 26 | 40 | 30:70 | No abnormality | 42 |
|  | 7 | 18 | 11 | 9.5 | 14 | 90:10 | Abnormality | 72 |
|  | 8 | 18 | 11 | 9.5 | 14 | 10:90 | No abnormality | 61 |
|  | 9 | 16 | 6 | 4.1 | 30 | 30:70 | No abnormality | 71 |

(Result)

Particle diameter distributions in Example 1 and Comparative Example 1 are shown in FIG. 1. In Comparative Example 1, two particle diameter distributions of the particles A and the particles B highly overlapped, whereas in Example 1, the particles A and the particles B had respective particle diameter distributions which did not overlap. Moreover, in Examples 1 to 9, the capacity retention ratio was 70% or more even after 1000 cycles and the battery had excellent life characteristics. With regard to the batteries in Examples 1 to 9, there was no abnormality in the result of the nail penetration test and the batteries were satisfactory in thermal stability. In Example 10, although the battery exhibited excellent life characteristics and there was no abnormality in the result of the nail penetration test, cracking or the like was generated in a part of the battery case and liquid leakage occurred partially. On the other hand, since, in Comparative Examples 1 and 2, the difference between B(D50) and A(D50) was less than 5 μm, in Comparative Examples 3 to 5, any one of the half-value widths of the particles A and the particles B was more than 20 μm, in Comparative Example 6, the particle diameter of the particles B was more than 50 μm, and in Comparative Examples 7 and 8, the particles A and the particles B did not satisfy the requirement on the mixing proportion, and the batteries were not satisfactory in at least one of the nail penetration test and the capacity retention ratio.

In this connection, the present inventors presume the reason why the effect of the present invention is attained, as follows. In the present invention, two positive active materials are used in which the respective widths of the two particle diameter distributions are narrower than those of the two conventional ones and the two particle diameter distributions slightly overlap. From this, since the distribution of active materials in the positive electrode is more homogeneous, the reaction with the electrolyte is also more homogeneous and the current distribution in the positive electrode is also more homogenized. Moreover, since the distribution of active materials in the positive electrode is more homogeneous, the stress of expansion or contraction of the positive active material at the time of charge-discharge of a battery is equalized and a decrease in current collection property is suppressed. In the present invention, since the homogeneity of current distribution in the positive electrode can be secured and a decrease in current collection property can be suppressed even under a high temperature environment, it is considered that the nonaqueous electrolyte secondary battery has a high capacity and excellent cycle characteristics even under a high temperature environment.

INDUSTRIAL APPLICABILITY

According to the present invention, since it is possible to provide a nonaqueous electrolyte secondary battery which has a high level of energy density and excellent life characteristics under a high temperature environment, the nonaqueous electrolyte secondary battery has a high industrial utility value.

The invention claimed is:

1. A nonaqueous electrolyte secondary battery, comprising particles A of a lamellar type lithium transition metal oxide and particles B of a spinel type lithium transition metal oxide, as a positive active material, at a ratio within the range of A:B=20:80 to 80:20 (weight ratio), wherein
a particle size distribution of the positive active material has a peak based on the particles A and a peak based on the particles B within the range of 1 to 50 μm,
in a particle size distribution in terms of volume, a particle diameter A(D50) at a degree of accumulation of the particles A of 50% and a particle diameter B(D50) at a degree of accumulation of the particles B of 50% satisfy the following expression (1), and a particle diameter A(D95) at a degree of accumulation of the particles A of 95% and a particle diameter B(D5) at a degree of accumulation of the particles B of 5% satisfy the following expression (2):

$$B(D50) - A(D50) \geq 5 \text{ μm} \qquad \text{Expression (1)}$$

$$B(D5) > A(D95) \qquad \text{Expression (2)},$$

the particle diameter A(D50) at a degree of accumulation of the particles A of 50% is less than 5 μm, and the lamellar type lithium transition metal oxide is a lithium transition metal oxide represented by a general formula $LiNi_xMn_yCo_zQ_aO_2$ (Q denotes at least one element selected from the group consisting of group 2 to group 15 elements in the Periodic Table of the Elements, and x+y+z+a=1, x>0, y>0, z>0 and 0.1≥a>0).

2. A nonaqueous electrolyte secondary battery, comprising particles A of a lamellar type lithium transition metal oxide and particles B of a spinel type lithium transition metal oxide, as a positive active material, at a ratio within the range of A:B=20:80 to 80:20 (weight ratio), wherein a particle size distribution of the positive active material has a peak based on the particles A and a peak based on the particles B within the range of 1 to 50 μm, in a particle size distribution in terms of volume, a particle diameter A(D50) at a degree of accumulation of the particles A of 50% and a particle diameter B(D50) at a degree of accumulation of the particles B of 50% satisfy the following expression (3):

$B(D50)/A(D50) > 4$     Expression (3), the particle diameter A(D50) at a degree of accumulation of the particles A of 50% is less than 5 μm, and the lamellar type lithium transition metal oxide is a lithium transition metal oxide represented by a general formula $LiNi_xMn_yCo_zQ_aO_2$ (Q denotes at least one element selected from the group consisting of group 2 to group 15 elements in the Periodic Table of the Elements, and x+y+z+a=1, x>0, y>0, z>0 and 0.1≥a>0).

3. The nonaqueous electrolyte secondary battery according to claim 1, wherein each of a half-value width of the peak based on the particles A and a half-value width of the peak based on the particles B is 20 μm or less.

4. The nonaqueous electrolyte secondary battery according to claim 1, wherein a minimum particle diameter of the particles B is larger than a maximum particle diameter of the particles A.

5. The nonaqueous electrolyte secondary battery according to claim 1, wherein the x in the general formula is within the range of 0.5≥x.

6. The nonaqueous electrolyte secondary battery according to claim 1, comprising the particles A of a lamellar type lithium transition metal oxide and the particles B of a spinel type lithium transition metal oxide, as the positive active material, at a ratio within the range of A: B=20:80 to 50:50 (weight ratio).

7. The nonaqueous electrolyte secondary battery according to claim 1, comprising a separator, wherein the separator is provided with an inorganic compound on a positive electrode side surface.

8. The nonaqueous electrolyte secondary battery according to claim 2, wherein each of a half-value width of the peak based on the particles A and a half-value width of the peak based on the particles B is 20 μm or less.

9. The nonaqueous electrolyte secondary battery according to claim 2, wherein a minimum particle diameter of the particles B is larger than a maximum particle diameter of the particles A.

10. The nonaqueous electrolyte secondary battery according to claim 2, wherein the x in the general formula is within the range of 0.5≥x.

11. The nonaqueous electrolyte secondary battery according to claim 2, comprising the particles A of a lamellar type lithium transition metal oxide and the particles B of a spinel type lithium transition metal oxide, as the positive active material, at a ratio within the range of A: B=20:80 to 50:50 (weight ratio).

12. The nonaqueous electrolyte secondary battery according to claim 2, comprising a separator, wherein the separator is provided with an inorganic compound on a positive electrode side surface.

* * * * *